United States Patent [19]

Spitzer et al.

[11] 4,120,942

[45] Oct. 17, 1978

[54] STAGED REHYDRATION OF ALUMINA

[75] Inventors: Donald P. Spitzer, Riverside; William Edward Bambrick, Old Greenwich, both of Conn.

[73] Assignee: American Cyanamid Company, Stamford, Conn.

[21] Appl. No.: 842,849

[22] Filed: Oct. 17, 1978

Related U.S. Application Data

[63] Continuation of Ser. No. 696,093, Jun. 14, 1976, abandoned.

[51] Int. Cl.[2] .............................................. C01F 7/02
[52] U.S. Cl. .................................. 423/626; 423/628; 423/630; 423/631; 252/463

[58] Field of Search ............... 423/625, 628, 626, 630, 423/631; 252/463

[56] References Cited

U.S. PATENT DOCUMENTS

| | | | |
|---|---|---|---|
| 3,223,483 | 12/1965 | Osment | 423/628 |
| 3,403,111 | 9/1968 | Colgan et al. | 423/631 |
| 3,608,060 | 9/1971 | Osment et al. | 252/463 |
| 3,925,257 | 12/1975 | Horzepa et al. | 423/625 |
| 3,975,510 | 8/1976 | Leach et al. | 423/628 |

Primary Examiner—Herbert T. Carter
Attorney, Agent, or Firm—Gordon L. Hart

[57] ABSTRACT

Disclosed is a method for forming shaped catalysts from a rehydratable alumina composition. The method includes a staged rehydration procedure to stabilize the rehydratable alumina to facilitate extrusion processing.

8 Claims, No Drawings

STAGED REHYDRATION OF ALUMINA

This is a continuation, of application Ser. No. 696,093 filed June 14, 1976, and now abandoned.

The invention relates to the preparation of alumina extrudates. More particularly, the invention is directed to shaped catalysts and catalyst supports prepared from a rehydratable alumina composition. The method of preparation includes a staged rehydration procedure to stabilize the rehydratable alumina so that extrusion can be effectively accomplished.

High purity aluminum oxide exhibits excellent qualities as a catalyst or catalyst base material and is widely used as a support for various catalytic promoters. Further, it has been found that in many instances alumina bodies prepared from a rehydratable form of alumina exhibit superior physical properties to other known aluminas.

A known process for preparing shaped alumina bodies from rehydratable alumina generally includes the steps of first partially dehydrating an alumina trihydrate to form an alumina composition including a substantial portion of a rehydratable form of alumina, often termed rho alumina. Rehydration is the adding of chemically bound water of hydration to the crystalline structure of the alumina. This rehydratable alumina composition is ground to a desired particle size and then mixed with water and formed into shaped bodies. The shaped forms are cured and finally are activated and hardened by application of heat.

The present invention specifically is directed to the forming stage of the process. Formed alumina bodies commonly have been produced by shaping methods such as beading, pelletizing or extruding. In conventional extrusion procedures, alumina powder is blended with water to form a mix of the proper consistency for extrusion. Typically a screw type extruder is employed to extrude the mix through a die plate fixed with orifices of the desired size and shape. The strands formed upon extrusion then are cut to a chosen length.

However, it has been noted in working with rehydratable alumina compositions that such alumina powder often cannot be processed to form extrudates using known extrusion techniques. This is due to the fact that an alumina extrusion mix containing substantial amounts of a rehydratable form of alumina sets up in an extruder to form a cementitious mass that can bind the extruder screw within its barrel and accordingly prevents extrusion. It is hypothesized that the rehydratable form of alumina in the presence of water in an extrusion mix undergoes rehydration which results in the non-extrudable formation.

An object of the present invention is to provide a method to accomplish extrusion of alumina powder compositions containing substantial portions of a rehydratable form of alumina.

DESCRIPTION OF A PREFERRED EMBODIMENT

According to a preferred method for producing shaped activated alumina for catalysts and catalyst supports according to the present invention, hydrated alumina, such as is generally produced from bauxite ore using the Bayer process, is initially flash calcined to produce a partially dehydrated, rehydratable product consisting of anhydrous alumina, lower hydrate forms of alumina, alumina monohydrate, and unreacted trihydrate. The rehydratable alumina which can be used in the present process may vary in composition. The powder commonly can be characterized by its LOI (loss on ignition) and its RI (rehydration index). The LOI is determined by measurement of the amount of weight loss on heating the alumina powder at 1800° F. for 2 hours. The RI, which denotes the amount of rehydratable alumina present in the powder, is computed according to the formula:

$$RI = \frac{3700 \ (LOI \ after \ rehydration - LOI \ before \ rehydration)}{15 \ (100 - LOI \ after \ rehydration)}$$

In the rehydratable alumina composition of the present invention, LOI measurements in the general range of 3-15 are considered preferable. The rehydration index should be between 15 and 80, with a preferred range of 40 to 60. In general, the preparation method for the rehydratable alumina consists of partially dehydrating alumina trihydrate by passing it through a flow of high temperature gas for a fraction of a second to several seconds. The composition of the resulting product varies according to the trihydrate feed rate, the particle size, the gas temperature, and the residence time of the particle in the gas stream. This rehydratable powder composition can be milled or ground to reduce the particle size and then mixed with water and formed into beads, pellets or extrudates as desired. The formed alumina may be hardened or cured to increase crush strength. Steam treatment curing has been found to be preferable. The alumina forms are then dried and calcined. There are various known methods of forming shaped alumina bodies, such as beading or extruding. However, extrudates appear, in many cases, to be the preferred form for catalysts and catalyst supports. Manufacture of extrudates, unfortunately, is complicated by the fact that it has been noted in working with rehydratable alumina compositions that such alumina powders often can be processed only with difficulty to form extrudates using known extrusion techniques. Hence, preparation of alumina extrudates from rehydratable alumina compositions is not as straightforward as it is for other alumina compositions such as precipitated alumina (PA). PA is processed into extrudates simply by mulling it with water and extruding. This procedure regularly fails with rehydratable alumina compositions because of the rehydration reaction between the alumina and water which results in a rehydrated cementitious mass that can bind the extruder screw within its barrel and prevent extrusion.

Soda impurities are inherently present in alumina from the Bayer process which involves precipitation of aluminum hydrate from sodium aluminate solution. Hence, an additional problem when working with rehydratable alumina is. its characteristically high soda ($Na_2O$) content (about 0.2-0.5%). This amount of soda is undesireable for many applications. Accordingly, a washing or soda removal procedure often must be incorporated somewhere in the processing scheme in order to reduce soda content to an acceptable level.

Accordingly, a processing method has been developed to compensate for the above-recited problems. Rehydration of the rehydratable alumina powder before extrusion has been found to stabilize the alumina so as to permit mulling and extrusion without cementitious formation. In particular, it has been discovered that acidic rehydration accomplishes a staged rehydration which results in a final product with desirable properties. Several alternative rehydration procedures may be employed. The rehydratable alumina may, for example, be acid rehydrated by heating the alumina powder in water at about 100° C. for several hours with about 4-5% $HNO_3$ based on the weight of the alumina. Afterwards, this slurry can be filtered, washed and spray dried prior to mulling and extruding. Another more advantageous procedure is to acid-rehydrate the alumina at high solids levels, so that the mix can afterwards be mulled and extruded directly.

It is hypothesized that acid rehydration accomplishes staged rehydration of the rehydratable alumina to a stable monohydrate form which does not rehydrate further under the muller and extrusion conditions. Although the use of nitric acid has proven to be successful, other acids may be readily substituted, e.g. $H_3PO_4$, $H_2SO_4$, $H_2CO_3$. It has been observed through experimentation that operation of the rehydration step below pH 7 results in the formation of monohydrate which produces a product of higher surface area and micropore volume. Rehydration at pH above 7 results in formation of a mixture of mono- and tri-hydrates, not primarily monohydrate.

A particularly advantageous procedure has been found to be the use of carbonic acid for rehydration. In this procedure, the aqueous slurry of rehydratable alumina is contacted with $CO_2$ to reduce the pH. The relatively weak carbonic acid has been found adequate to repress trihydrate formation during rehydration and to remove soda impurities. During the high temperature calcining in catalyst preparation, the carbonate residues formed are discharged to the atmosphere with minimal pollution problems.

A further rehydration processing variation is based on the observation that rehydratable alumina slurries at ambient temperature can be readily filtered to form a high solids (about 50-55%) filter cake. Accordingly, rehydratable alumina can be slurried at ambient temperature (preferably to about 10-20% solids) neutralized with acid, filtered and washed. Soda thus is reduced to less than 0.03%. The filter cake is heated to produce rehydration of the alumina, then is mulled and extruded.

The high solids rehydration processes involve heating a high solids slurry, during which the slurry mix is transformed from a fluid to a solid cake. Accordingly, it becomes necessary to crush the cake prior to mulling. An alternative to avoid this additional handling is to rehydrate in a heated mixer which yields a granular product directly suitable for mulling or extrusion.

In a variation to the above method of processing, it has been found that treatment of a rehydratable alumina slurry (preferably about 20% solids) with $CO_2$ with application of heat and pressure provided a slurry which could be filtered to yield a low $Na_2O$, high solids filter cake suitable for direct mulling or extrusion. Preferable temperature and pressure has been found to be about 65° C. and about 100 psig.

The following examples demonstrate preparation of catalysts and catalyst supports using the method of the present invention. They are not intended to be limiting but Extrudate Preparation From a Rehydratable Alumina Example 1

400 grams of a rehydratable alumina powder (RI 50) was added over a period of 5 minutes to an 85° C. acid solution of 20 grams of nitric acid in 3 liters of water. The temperature of this alumina — acid mixture then was held between 90° and 100° C. for 2 hours. The pH at the end of this time was 5.3. 18 Ml of 29% $NH_3$ then was added to raise the pH to 7.3. The alumina was separated by filtration, washed, reslurried, and spray-dried. 200 grams of the spray-dried powder was mulled with 120 grams of water and 2 grams $NH_3$ for 30 minutes and then extruded. The extrudates were dried at 250° F. for 30 minutes and then calcined at 1200° F. for 1 hour. The resulting product was determined to have a pore volume of 0.68 ml/gm.

Example 2

600 gm of a rehydratable alumina powder (RI 50), 500 gm $H_2O$ and 25 gm $HNO_3$ were mixed together to form a slurry. This slurry was heated in a closed container at 80°-90° C. for 1 hour. The resulting hardened mix was mulled for 30 minutes with 35 ml of 29% $NH_3$. The muller mix was then extruded and the shaped extrudates were dried at 250° F. and calcined at 1200° F. The calcined extrudates were washed with 10 to 20 times their weight in water for about 1 hour and then dried and calcined at 1000° F. The resulting product was determined to have a pore volume of 0.69 ml/gm.

Example 3

600 gm of a rehydratable alumina powder (RI 50) was mixed with 490 gm $H_2O$ at room temperature. The slurry pH decreased from approximately 9 to approximately 7 by adding nitric acid (approximately 1% of the weight of the alumina). The slurry was filtered and the filter cake was washed. The filter cake contained 50-55% $Al_2O_3$. This filter cake was heated (80°-90° C.) for approximately 1 hour in a closed container to produce rehydration, then mulled and extruded. The extrudates were dried and calcined as above. The resulting pore volume was 0.78 ml/gm.

We claim:

1. A method of preparing formed alumina extrudates from a partially dehydrated, rehydratable alumina prepared by flash calcining Bayer process alumina, and having LOI in the range from 3 to 15 and rehydration index in the range from 15 to 80, said method comprising:

rehydrating said partially dehydrated alumina by mixing with water which contains acid at pH below 7 and heating the mixture to 80°-100° C. for the time needed for rehydration;

solidifying the rehydrated alumina; mulling the solidified, rehydrated alumina with sufficient water to make a mulled mixture suitable for extrusion;

extruding the mulled mixture into a desired extrudate shape; and drying said extrudate shapes and calcining the dried extrudate to activate the alumina.

2. The method of claim 1 including a washing step to remove soda impurities from the alumina.

3. The method of claim 2 wherein said rehydrating comprises:

mixing the rehydratable alumina composition with water to form an aqueous slurry;

adding acid to said slurry to main a pH level below 7;

filtering said aqueous slurry of alumina to form a high solids filter cake;

washing said filter cake with water to remove soda impurities; and heating the washed filter cake to rehydrate said rehydratable alumina.

4. The method of claim 2 including a curing step to harden the extrudate shape before the drying and calcining step.

5. The method of claim 4 wherein said curing step comprises steam treatment of the defined extrudate shape.

6. The method of claim 1 wherein said pH level below 7 is maintained by the introduction of $CO_2$.

7. The method of claim 1 wherein pH of the water in the defined rehydrating step is maintained below pH7 by addition of an acid selected from the group consisting of nitric acid, sulfuric acid, phosphoric acid and carbonic acid.

8. The method of claim 7 wherein said pH level below 7 is maintained by the addition of nitric acid.

* * * * *